(12) United States Patent
Hersam et al.

(10) Patent No.: US 11,088,392 B2
(45) Date of Patent: Aug. 10, 2021

(54) NANOSTRUCTURED LITHIUM-ION BATTERY ELECTRODE COMPOSITE MATERIALS VIA CONFORMAL GRAPHENE DISPERSION

(71) Applicant: Northwestern University, Evanston, IL (US)

(72) Inventors: Mark C. Hersam, Wilmette, IL (US); Kan-Sheng Chen, Chicago, IL (US); Ethan B. Secor, Chicago, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 1 day.

(21) Appl. No.: 15/906,776

(22) Filed: Feb. 27, 2018

(65) Prior Publication Data
US 2018/0254517 A1     Sep. 6, 2018

Related U.S. Application Data

(60) Provisional application No. 62/464,167, filed on Feb. 27, 2017.

(51) Int. Cl.
| | |
|---|---|
| *H01M 10/0525* | (2010.01) |
| *H01M 4/04* | (2006.01) |
| *H01M 4/1393* | (2010.01) |
| *H01M 4/505* | (2010.01) |
| *H01M 4/131* | (2010.01) |
| *H01M 4/133* | (2010.01) |
| *H01M 4/134* | (2010.01) |

(Continued)

(52) U.S. Cl.
CPC ..... *H01M 10/0525* (2013.01); *H01M 4/0416* (2013.01); *H01M 4/131* (2013.01); *H01M 4/133* (2013.01); *H01M 4/134* (2013.01); *H01M 4/136* (2013.01); *H01M 4/139* (2013.01); *H01M 4/1393* (2013.01); *H01M 4/505* (2013.01); *H01M 4/625* (2013.01); *H01M 2004/027* (2013.01); *H01M 2004/028* (2013.01)

(58) Field of Classification Search
None
See application file for complete search history.

(56) References Cited

U.S. PATENT DOCUMENTS

6,159,636 A * 12/2000 Wang ............... C01G 45/1221
429/223
8,691,441 B2   4/2014 Zhamu et al.
(Continued)

FOREIGN PATENT DOCUMENTS

| JP | 2016189294 A | 11/2016 |
|---|---|---|
| WO | 2011141486 A1 | 11/2011 |
| WO | 2014015139 A1 | 1/2014 |

OTHER PUBLICATIONS

Jaber-Ansari et al., "Suppresing Manganese Dissolution from Lithium Manganese Oxide Spinel Cathodes with Single-Layer Graphene", Advanced Energy Materials, 2015, No. 5.
(Continued)

*Primary Examiner* — Zhongqing Wei
(74) *Attorney, Agent, or Firm* — Locke Lord LLP; Tim Tingkang Xia, Esq.

(57) ABSTRACT

Composites comprising anode and cathode active materials conformally coupled to few-layered graphene, corresponding electrodes and related methods of preparation.

11 Claims, 19 Drawing Sheets
(19 of 19 Drawing Sheet(s) Filed in Color)

(51) Int. Cl.
    *H01M 4/62*     (2006.01)
    *H01M 4/139*    (2010.01)
    *H01M 4/136*    (2010.01)
    *H01M 4/02*     (2006.01)

(56) References Cited

U.S. PATENT DOCUMENTS

| | | |
|---|---|---|
| 9,079,764 B1 | 7/2015 | Hersam et al. |
| 9,834,693 B2 | 12/2017 | Hersam et al. |
| 9,902,866 B2 | 2/2018 | Hersam et al. |
| 2012/0064409 A1* | 3/2012 | Zhamu .................. B82Y 30/00 |
| | | 429/221 |
| 2012/0088151 A1 | 4/2012 | Yamazaki et al. |
| 2015/0044556 A1 | 2/2015 | Wang et al. |
| 2015/0044564 A1 | 2/2015 | Wang et al. |
| 2015/0072162 A1 | 3/2015 | Hersam et al. |
| 2017/0110720 A1 | 4/2017 | Hersam et al. |

OTHER PUBLICATIONS

Korean Intellectual Property Office (ISA/KR), "International Search Report for PCT/US2018/019965", Korea, dated Dec. 26, 2018.
Jaber-Ansari, L. et al., "Suppressing Manganese Dissolution from Lithium Manganese Oxide Spinel Cathodes with Single-Layer Graphene", Advanced Energy Materials, 5, 1500646-1500655, 2015.
European Patent Office, "Extended European Search Report for No. 18805721.0", Germany, dated Nov. 23, 2020.

\* cited by examiner

NANOSTRUCTURED LITHIUM-ION BATTERY ELECTRODE COMPOSITE MATERIALS VIA CONFORMAL GRAPHENE DISPERSION

This application claims priority to and the benefit of application Ser. No. 62/464,167 filed Feb. 27, 2017, the entirety of which is incorporated herein by reference.

This invention was made with government support under DE-AC02-06CH11357 awarded by the Department of Energy and FA8650-15-2-5518 awarded by the Air Force Research Laboratory. The government has certain rights in the invention.

BACKGROUND OF THE INVENTION

One of the most pressing challenges facing modern society is the development of high-performance energy storage systems for applications ranging from portable electronic devices and emission-free transportation (e.g., electric vehicles) to emerging smart grids based on renewable energy sources. Thus far, lithium-ion batteries (LIBs) have been the most successful technology in fulfilling demanding energy storage requirements as a result of their high energy density and low carbon footprint. However, due to a variety of materials issues, LIBs have limited charge/discharge rate, stability, safety, and temperature range that have hindered their adoption in many sectors. In an effort to overcome these limitations, significant effort has been focused on nanostructured LIB electrode materials, which offer unique opportunities to introduce novel functionality and resolve issues associated with their bulk counterparts. A prominent example is the severe capacity fading of Li-alloying anode materials (e.g., Si) due to inherently large volumetric expansion and contraction, which causes cracking and pulverization of the active materials during repeated lithium insertion/extraction processes. For instance, by reducing the characteristic dimensions of the active materials below their critical breaking size this cracking issue can be circumvented, thereby allowing improved capacity retention. Moreover, nanostructured electrodes offer large active material/electrolyte contact area and short lithium ion/electron diffusion paths, which improves charging/discharging capacity and kinetics.

Despite these compelling advantages, nanostructured electrodes possess several impediments that have hindered large-scale commercial adoption. In particular, increases in electrode/electrolyte side reactions due to the large interfacial area deteriorates cycling and calendar life, while poor packing density and high additive content limit volumetric energy density. It is, therefore, a critical challenge in the art to develop materials and processing strategies that maintain the benefits of nanostructured electrodes while simultaneously resolving such persistent problems.

SUMMARY OF THE INVENTION

In light of the foregoing, it is an object of the present invention to provide cathode composite materials, together with corresponding lithium-ion cathodes and methods of use and preparation, thereby overcoming various deficiencies and shortcomings of the prior art, including those outlined above. It will be understood by those skilled in the art that one or more aspects of this invention can meet certain objectives, while one or more aspects can meet certain other objectives. Each objective may not apply equally, in all its respects, to every aspect of this invention. As such, the following objects can be viewed in the alternative with respect to any one aspect of this invention.

It can be an object of this invention to provide anode and cathode composite materials comprising unaggregated nanoparticles with high packing densities and loadings, as compared to such electrode composite materials of the prior art.

It can also be an object of the present invention to stabilize such active materials without unduly limiting volumetric energy densities.

It can also be an object of the present invention, alone or together with one or more of the preceding objectives, to achieve such results without conductive additives and binders of the prior art, including but not limited to carbon black and polyvinylidene fluoride.

Other objects, features, benefits and advantages of the present invention will be apparent from the summary and the following descriptions of certain embodiments, and will be readily apparent to those skilled in the art having knowledge of various lithium-ion batteries, anodes, cathodes, cathode and anode active materials and related methods of fabrication. Such objects, features, benefits and advantages will be apparent from the above as taken into conjunction with the accompanying examples, data, figures and all reasonable inferences to be drawn therefrom, together with the references incorporated herein.

In part, the present invention can be directed to a composite comprising few-layered graphene comprising mono-, bi- and n-layered graphene wherein n can be an integer selected from 3- about 6; and nanoparticles of a material selected from anode and cathode active materials for a lithium-ion battery, wherein the surface of such a nanoparticle can be coupled to and conformally coated with such few-layered graphene, providing such graphene is not graphene oxide and is not reduced graphene oxide. Without limitation, such a cathode active material can be selected from lithium cobalt oxide, lithium iron phosphate, lithium manganese oxide (LMO), lithium nickel manganese cobalt oxide and lithium nickel cobalt aluminum oxide. In certain such embodiments, a cathode material can be LMO, as can comprise a spinel structure. Conversely, without limitation, an anode active material can be selected from lithium titanate, natural and artificial graphite, activated carbon, carbon black and silicon. Various other anode and cathode active materials useful in conjunction with this invention will be understood by those in the art made aware of this invention. Regardless, in certain such embodiments, such a composite can comprise an annealation product of an ethyl cellulose.

In part, the present invention can also be directed to a lithium-ion battery cathode composite material comprising few-layered graphene comprising mono-, bi- and n-layered graphene, wherein n can be an integer selected from 3- about 6; LMO nanoparticles, wherein the surface of such a nanoparticle can be coupled to and conformally coated with such few-layered graphene; and an annealation product of an ethyl cellulose, providing such graphene is not graphene oxide and is not reduced graphene oxide. In certain embodiments, such LMO nanoparticles can comprise a spinel structure. Regardless, such an LMO component can be at least 80 wt. % of such a composite.

In part, the present convention can also be directed to a lithium-ion battery cathode comprising a composite material of the sort disclosed above or illustrated elsewhere herein. Without limitation, such a cathode can comprise LMO nanoparticles comprising a spinel structure. In certain such embodiments, the packing density of such LMO nanoparticles can be greater than about 2.0 g cm$^{-3}$. Regardless, such an LMO component can be at least 80 wt. % of such a composite material.

In part, the present invention can also be directed to a method of preparing a lithium-ion battery electrode. Such a method can comprise exfoliating a graphene source material with a medium comprising an organic solvent at least partially miscible with water, and a cellulosic polymer at least partially soluble in such an organic solvent; contacting such an exfoliated graphene-cellulosic polymer composition with a composition comprising a nanoparticulate anode or cathode active material of the sort described herein or would otherwise be understood by those skilled in the art and a hydrophobic fluid component; and depositing such compositions on a lithium-ion battery electrode substrate.

In certain non-limiting embodiments, such a cellulose polymer can be an ethyl cellulose. As a separate consideration, such an organic solvent and such an hydrophobic fluid component can be independently selected from $C_2$-$C_5$ alcohols, esters, amides, ethers and ketones and combinations thereof. In certain such embodiments, such an organic solvent can be selected from ethanol and dimethylformamide; and, without limitation, such a hydrophobic fluid component can comprise N-methyl-2-pyrrolidone, such as but not limited to where such an active material can be LMO.

Regardless, in certain non-limiting embodiments, at least a portion of such an exfoliated graphene medium can be contacted with an aqueous medium to concentrate exfoliated graphene and such a cellulosic polymer and a solid composition. In certain such embodiments, such a solid graphene-cellulosic polymer composition can be isolated from such exfoliating and aqueous media.

In part, the present invention can also be directed to a method of using a graphene-cellulosic polymer composition to improve, enhance, modulate and/or otherwise affect lithium-ion battery cathode performance. Such a method can comprise contacting and exfoliated graphene-cellulosic polymer composition with a composition comprising nanoparticulate LMO and a hydrophobic fluid component; depositing such compositions on a lithium-ion battery cathode substrate; and annealing such deposited compositions to conformally coat such an LMO nanoparticle with at least one of such graphene and an annealation product of such a cellulosic polymer. As demonstrated elsewhere herein, such a method can modulate or enhance the packing density of such LMO nanoparticles and/or manganese ion dissolution from such nanoparticles. Without limitation, such a cellulosic polymer can be an ethyl cellulose. Regardless, hydrophobic fluid components can be as provided above, discussed below or referenced elsewhere herein.

BRIEF DESCRIPTION OF THE DRAWINGS

The patent or application file contains at least one drawing executed in color. Copies of this patent or patent application publication with color drawing(s) will be provided by the office upon request and payment of the necessary fee.

DETAILED DESCRIPTION OF CERTAIN EMBODIMENTS

In accordance with certain non-limiting embodiments thereof, this invention can be considered in the context of nanostructured battery electrode composite materials and fabrication methods that: (1) use unaggregated primary nanoparticles for optimal kinetics; (2) achieve a high packing density and loading of active materials for improved volumetric/gravimetric energy density; and (3) effectively passivate active material surfaces to eliminate undesirable side reactions. Considering such criteria, and representative of various other anode and cathode-related embodiments of this invention, the present invention provides a processing strategy utilizing a cellulose-stabilized dispersion of primary nano-LMO particles and pristine graphene nanoflakes (GNF) to realize a nano-LMO/graphene composite (n-LG) cathode with substantially improved packing density and active material loading. Furthermore, due to the conformal graphene coating on the nano-LMO particle surfaces, this architecture suppresses deleterious electrode/electrolyte reactions and affords excellent cycling stability. The enhanced charge transfer resulting from nano-LMO and the highly conductive GNF network further yields excellent rate capability (~75% capacity retention at 20C rate) and unprecedented electrochemical performance at low temperatures with nearly full capacity retention at −20° C.

Nanoparticles are prone to aggregation into highly porous microparticles, giving rise to large voids. In addition, interparticle space between secondary microparticles further reduces the packing density of electrodes, deteriorating the volumetric and gravimetric capacity of the resulting LIB. An effective strategy is therefore necessary to retain the primary nanoparticle structure of the active materials while promoting a dense network with efficient electronic and ionic conduction pathways. In accordance therewith, the present invention, in one non-limiting embodiment, provides a unique cathode slurry comprising nano-LMO and GNF stabilized by an ethyl cellulose that offers improved packing density of nanostructured LIB cathodes. Without limitation, spinel LMO can be used, due to its high power, low cost, environmental friendliness, and safety. GNFs offer advantages as a conductive additive compared to carbon black including improved electrical conductivity, mechanical resilience, and high aspect ratio. Moreover, graphene can stabilize the LMO/electrolyte interface and suppressing Mn dissolution.

Figure 1A:
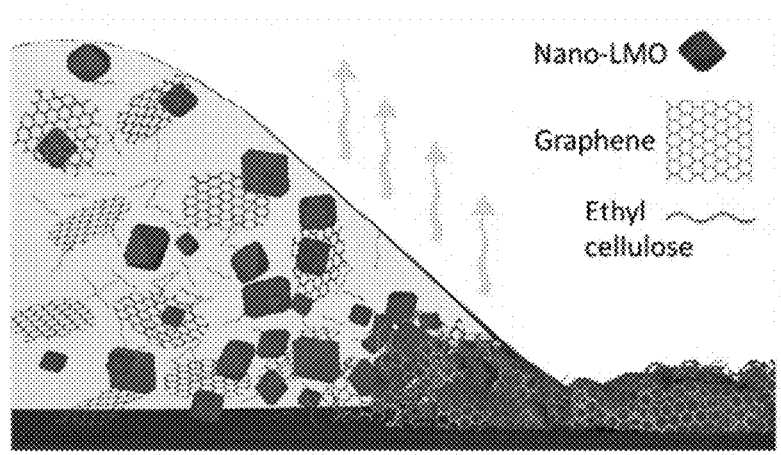
FIGS. 1A-I. Schematic fabrication and characterization of n-LG cathode. (A) Schematic illustration of ethyl cellulose-stabilized nano-LMO and GNF dispersion (left) that forms high packing density n-LG (right). (B) Thermogravimetric analysis determines the composition ratio of nano-LMO and GNFs in n-LG. (C,D) SEM images of n-LG (C) and nano-LMO control (D). (E,F) FIB-SEM tomography of n-LG (E) and nano-LMO control (F) electrodes with the same loading of nano-LMO. The electrodes are characterized after being cycled in half cells 20 times at 55° C. (G, H and I) TEM images of n-LG at different magnification.
Figure 1B:
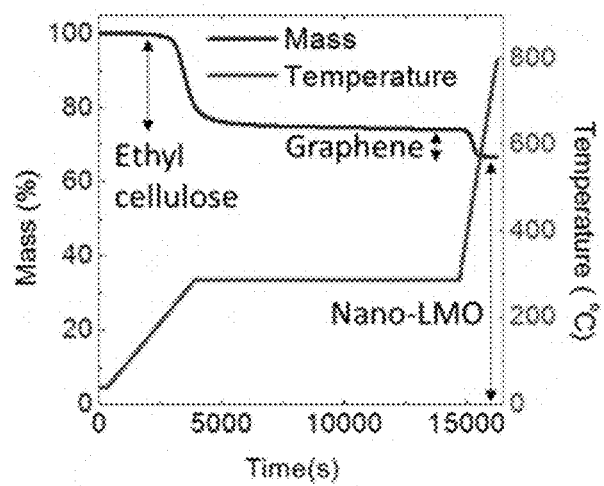

In one representative but non-limiting embodiment, the slurry is prepared with 66.7%, 7.3%, and 26% by weight of nano-LMO, GNF, and ethyl cellulose, respectively, using N-methyl-2-pyrrolidone (NMP) as a solvent. Ultrasonication is performed to disperse the nano-LMO particles and GNFs with ethyl cellulose, which effectively prevents aggregation of the nano-LMO particles. Subsequently, the slurry is cast onto aluminum foil and dried in a vacuum oven at 110° C. for 12 hours. As the NMP evaporates, the nano-LMO particles and GNFs remain well-dispersed to form a densely packed and uniform film as schematically illustrated in FIG. 1A. Finally, ambient annealing at 285° C. for 3 hours anneals and/or decomposes the ethyl cellulose (FIG. 1B), resulting in a binder-free n-LG cathode containing 90% wt. active material loading and 10% wt. conductive graphene/ethyl cellulose annealation product additive. (Without limitation to any one theory or mode of operation, an annealation product of ethyl cellulose can comprise amorphous carbon in gaps which may be present between GNFs.)

Figure 1C:
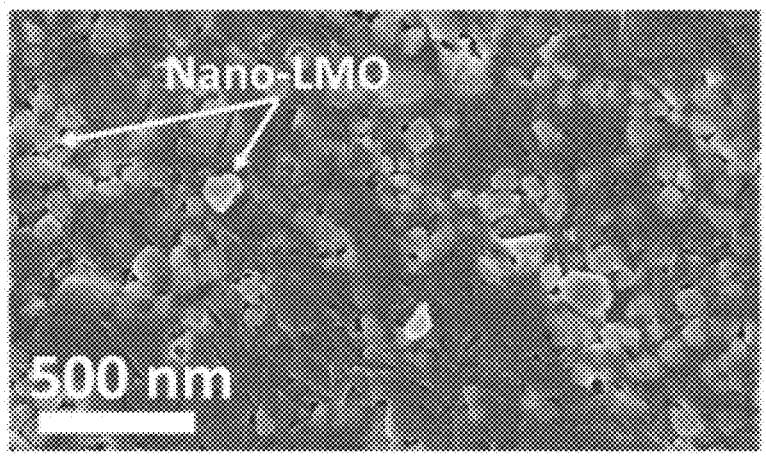
Figure 1D:
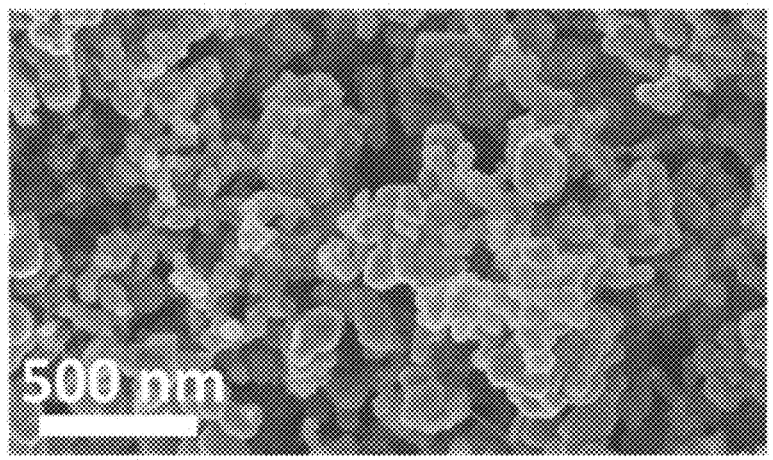
Figure 1E:
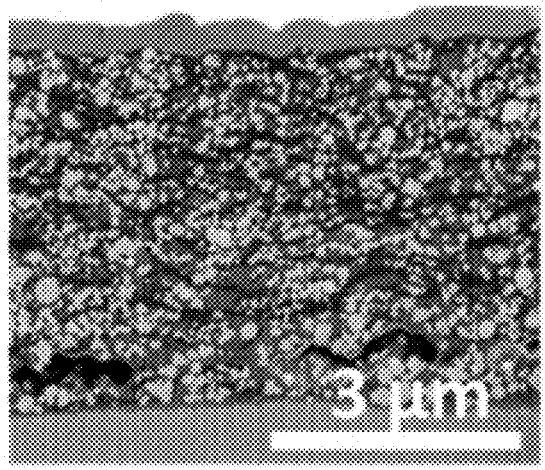
Figure 1F:
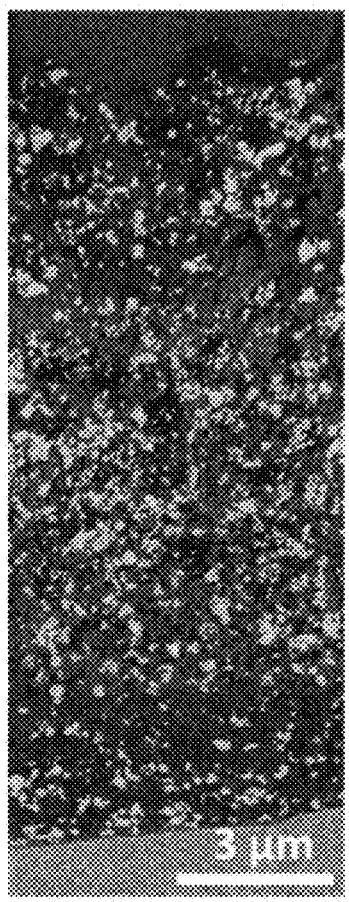
Figure 2:
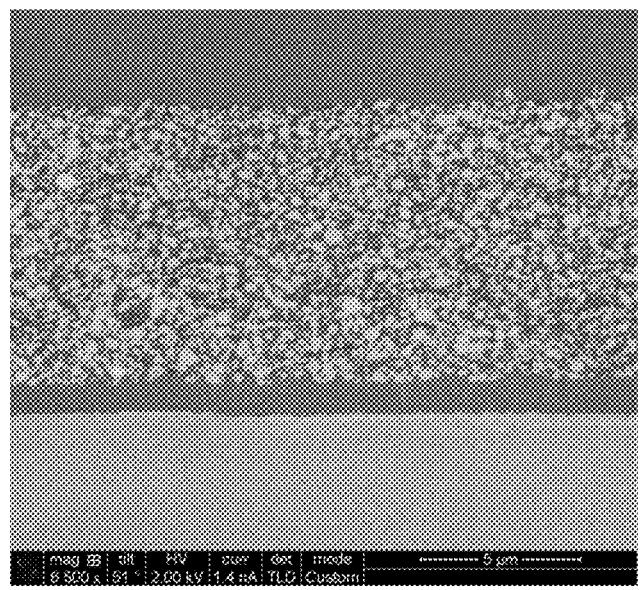
FIG. 2. FIB-SEM image of an as-prepared n-LG electrode. The bright features indicate nano-LMO in the n-LG electrode and are determined to occupy 50% volume of the entire electrode.

A scanning electron microscopy (SEM) image of the resulting n-LG film is shown in FIG. 1C, confirming that interparticle aggregation is mitigated with only small gaps observed between the primary nano-LMO particles. Uniform distribution of the GNFs in the composite is also evident. In sharp contrast, a nano-LMO control (FIG. 1D) prepared with nano-LMO, carbon black, and polyvinylidene fluoride (PVDF) binder in 8:1:1 weight ratio, respectively, shows substantial aggregation and uneven spacing between secondary clusters. More in-depth characterization of the electrode morphology is carried out using focused ion beam-SEM (FIB-SEM) tomography to investigate the n-LG and nano-LMO control electrodes following electrochemical cycling. As shown in FIG. 1E and FIG. 1F, secondary back-scattered electron signals indicate the spatial distribution of the nano-LMO (bright features), infiltrated epoxy (grey features), and conducting additives (dark features) in the n-LG and nano-LMO control, respectively. With the same loading of nano-LMO, it is evident that nano-LMO particles are much more uniformly and densely distributed in the n-LG than in the control, giving rise to markedly higher packing density of the active materials in n-LG. The homogeneous distribution of nano-LMO in n-LG also reveals that the integration of the electrode remains intact during coin cell assembly and electrochemical cycling, indicating the robustness of the binder-free n-LG. Quantitatively, by analyzing the FIB-SEM image of an as-prepared n-LG electrode (FIG. 2), a 50% volume ratio of the nano-LMO in the electrode is determined. Given the mass density of LMO spinel (4.281 g cm$^{-3}$), the active material packing density in n-LG is 2.1 g cm$^{-3}$, resulting in a volumetric energy density of 1030 Wh L$^{-1}$ at 0.2C current rate, which is 30% higher than previous work (785 Wh L$^{-1}$), where primary LMO nanoparticles were used as the active material. Furthermore, while there have been several reports employing graphene or carbon coatings to improve the performance of nanostructured LMO cathodes, the volumetric energy densities of those cathodes at 0.2C current rate were either not provided or inferior to value reported here.

Figure 1G:
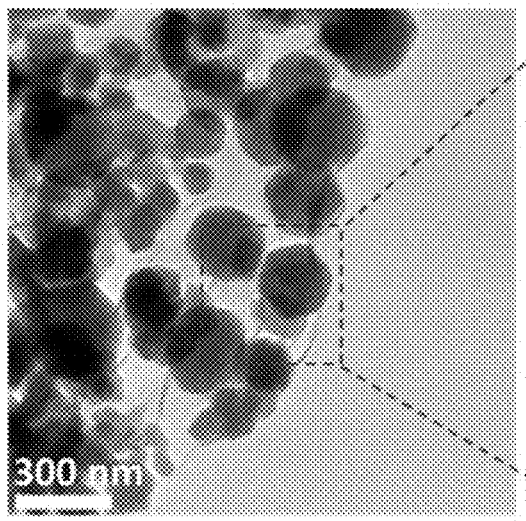
Figure 1H:
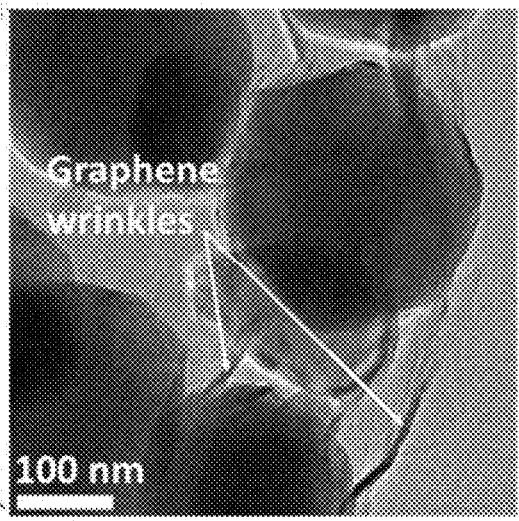
Figure 1I:
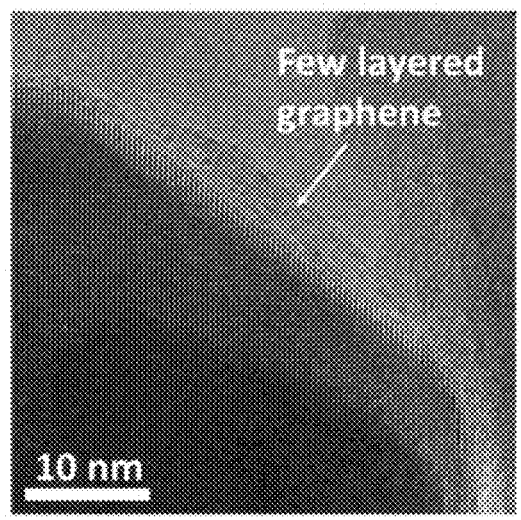
Figure 3:
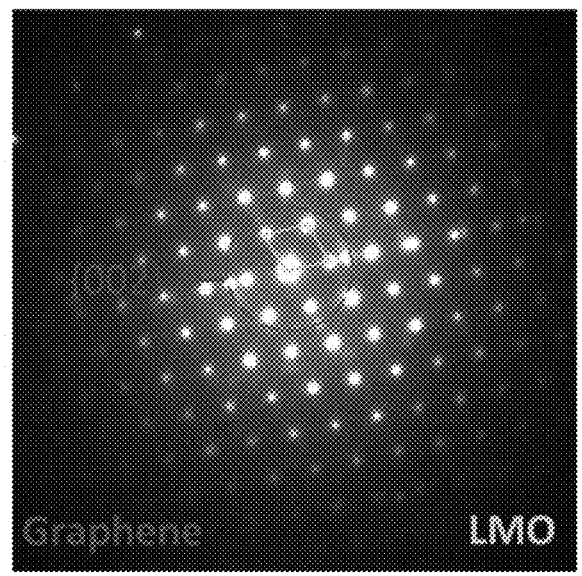
FIG. 3. TEM image of n-LG. Selected electron diffraction pattern taken from a nano-LMO particle in FIG. 1G.
Figure 4:
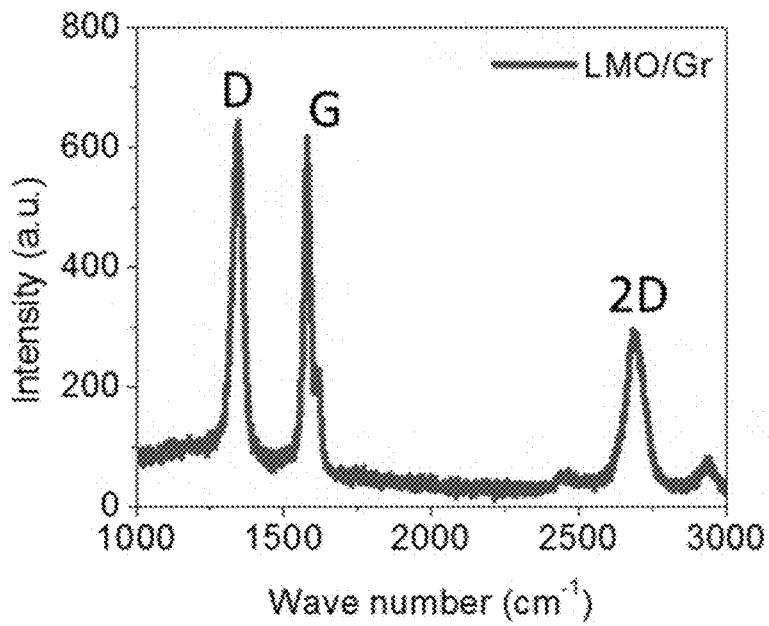
FIG. 4. Raman spectroscopy of n-LG. Three typical characteristic peaks (D, G, 2D) of sp$^2$ carbon are clearly present, confirming the presence of an annealation product of ethyl cellulose and that the physical structure of the graphene nanoflakes is preserved during the fabrication process of the n-LG composite cathode.

To inspect the structure of n-LG at the nanoscale, transmission electron microscopy (TEM) was performed, which shows that nano-LMO particles are evenly mixed with GNFs (FIG. 1G), with graphene conformally coating the nano-LMO particle surfaces (FIG. 1H). The higher resolution TEM image in FIG. 1I indicates intimate contact between nano-LMO particles and GNFs, along with the intact crystal structure of the individual nano-LMO particles. Electron diffraction for this particle (FIG. 3) reveals that the particle has single-crystal structure, which can be indexed as the [110] direction of LMO phase. The graphene layer can be identified in the diffraction pattern by detecting the {002} diffraction ring of graphite. Such observations are consistent with non-enabling density functional theory (DFT+U; U=4.5 eV for Mn) calculations with the opt-type van der Waals functional which also predict that the interaction between spinel LMO and graphene is thermodynamically favorable for both (001) and (111) LMO surfaces (i.e., energetically stable surface facets in LMO), with or without the presence of a graphene defect (not shown). Finally, the sp$^2$-carbon content of annealed ethyl cellulose and intact, pristine graphene nanoflakes is confirmed by Raman spectroscopy (FIG. 4).

Figure 5A:
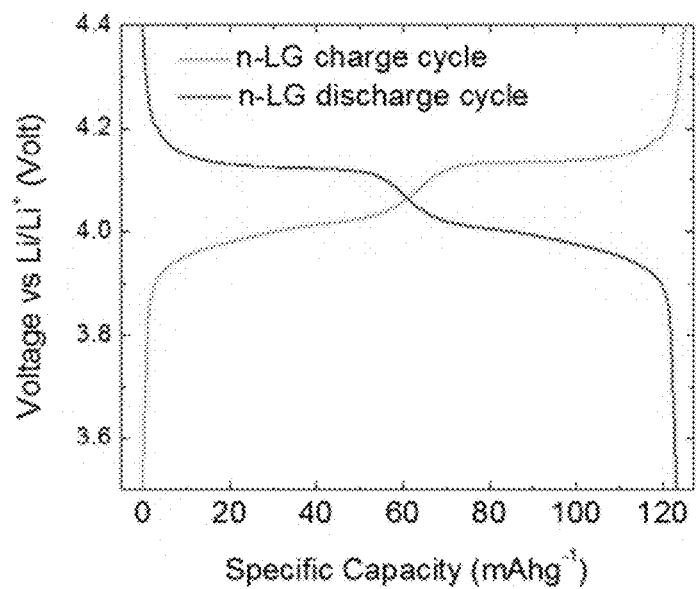
FIGS. 5A-D. Galvanostatic characterization and stability evaluation of n-LG and nano-LMO control. (A,B) Voltage profiles of n-LG in charge and discharge cycles with 0.2C current rate (A) and corresponding dQ/dV curves (B). (C,D) Cycling stability comparison between n-LG and nano-LMO control in a half-cell geometry (C) and full-cell geometry (D).
Figure 5B:
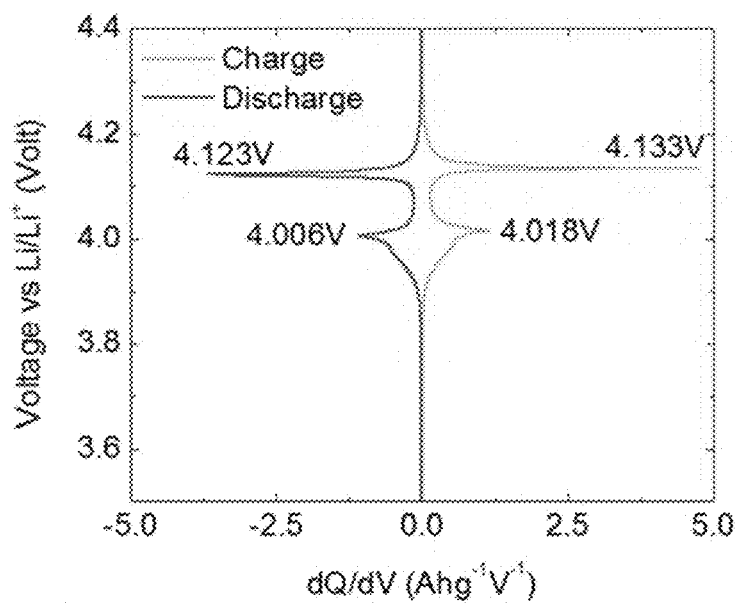

The electrochemical performance of the n-LG cathode is first evaluated in a half-cell configuration by galvanostatic measurements at a current rate of 0.2C (1C=148 mA g$^{-1}$). Charge/discharge voltage profiles in FIG. 5A show a pair of characteristic plateaus near 4 V and 4.1 V in both charge and discharge cycles. A more clear and quantitative comparison can be performed when the curves are plotted as differential capacity (V vs. dQ/dV), as shown in FIG. 5B. The peak separation of 10 mV between charging and discharging confirms minimal electrode polarization and therefore efficient reaction kinetics.

Historically, a major disadvantage of LMO cathode materials has been the relatively poor cycling performance resulting from disproportionation of $Mn^{3+}$ that produces soluble $Mn^{2+}$ at the cathode/electrolyte interface. As the $Mn^{2+}$ ions deplete from the LMO surface, the impedance of the LMO cathode increases. Furthermore, $Mn^{2+}$ ion migration to the graphite anode poisons the solid-electrolyte interface (SEI) on the anode surface, which also increases the impedance of the anode. Because the disproportionation reaction is surface-mediated, the inherently large surface area of nano-LMO particles can significantly increase the rate of this detrimental effect, leading to severe capacity fading following long term cycling. Previous approaches to address $Mn^{2+}$ dissolution include modification of the composition of the parent LMO crystals by bulk and surface doping to reduce the amount of $Mn^{3+}$ at the cathode/electrolyte interface, and the application of protective surface coatings to minimize direct contact between LMO and the electrolyte. As referenced above, without empirical demonstration or disclosure how such structures and effects might be achieved, theoretical computations predict that single-layer graphene coatings on a LMO thin film could improve both cathode stability (capacity retention) and kinetics (rate capability). (See, Jaber-Ansari, L.; Puntambekar, K. P.; Kim, S.; Aykol, M.; Luo, L.; Wu, J.; Myers, B. D.; Iddir, H.; Russell, J. T.; Saldaña, S. J.; Kumar, R.; Thackeray, M. M.; Curtiss, L. A.; Dravid, V. P.; Wolverton, C.; Hersam, M. C. *Adv. Energy Mater.* 2015, 5, 1500646-1500655.)

Figure 5C:
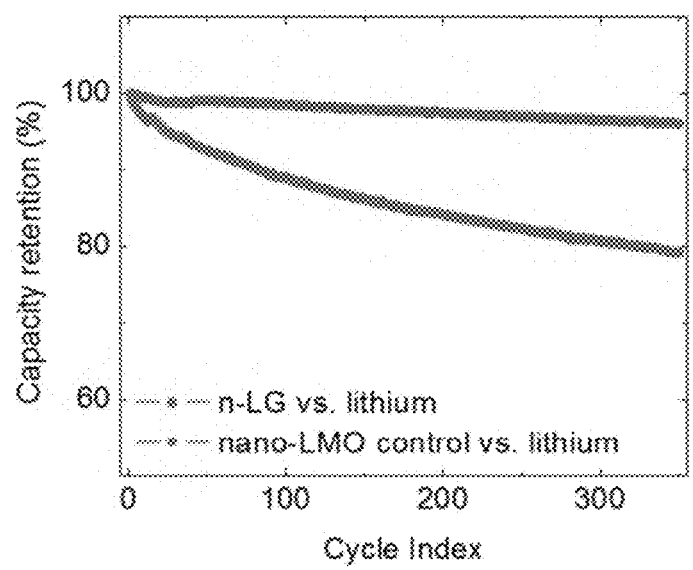
Figure 5D:
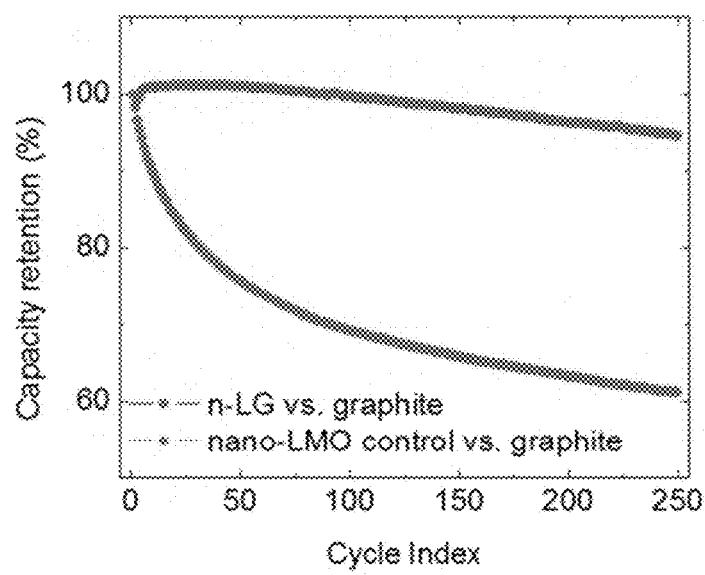
Figure 6A:
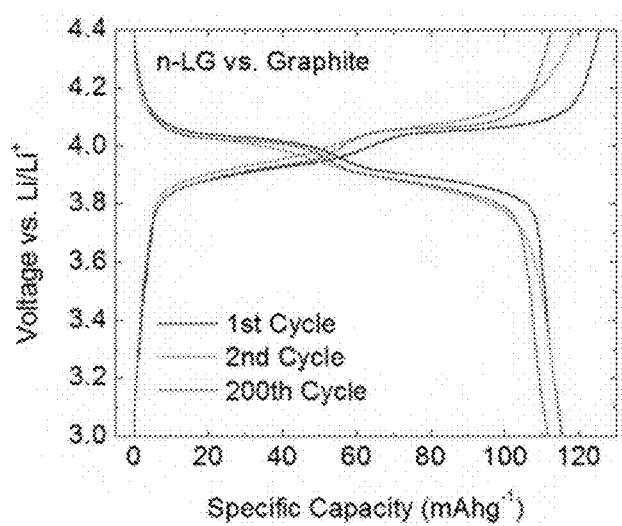
FIGS. 6A-B. Additional information for full-cell studies. (A) Voltage profiles of the n-LG full-cell at $1^{st}$, $2^{nd}$, and $200^{th}$ cycle. (B) Coulombic efficiency of the n-LG and nano-LMO control full-cells.
Figure 6B:
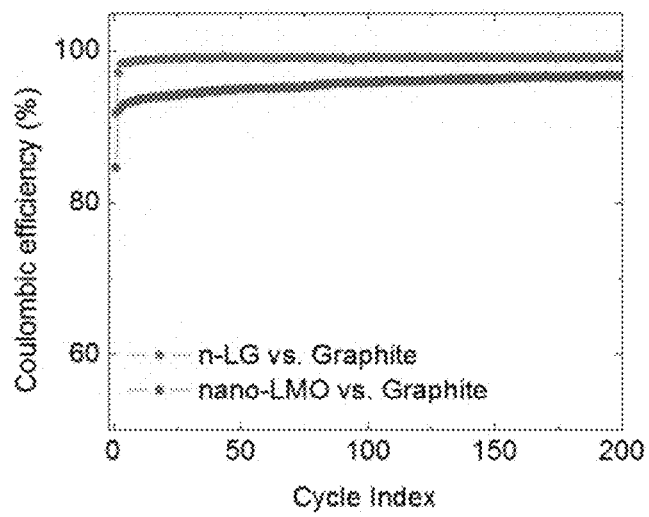

To investigate whether the results from an idealized graphene/LMO thin-film case apply to an n-LG composite of this invention, the cycling performance of the n-LG composite in both half-cell and full-cell geometries was accessed. In FIG. 5C, the n-LG half-cell, which employs Li metal as an anode, shows superior capacity retention of ~95% after 350 cycles at 1C current rate at 25° C., while the control exhibits 80% retention under the same conditions. The improved capacity retention of the n-LG half-cell is most likely due to surface protection by graphene. Confirming this conclusion, the differences in cycling life are even more pronounced for the full-cell geometry, as shown in FIG. 5D. The capacity fade of the control full-cell is greater than 35% after 250 cycles, which is attributed to the additional capacity fade from the degraded graphite anode, whose impedance increases upon $Mn^{2+}$ poisoning. On the other hand, the cell stability is nearly identical for the n-LG half-cell and full-cell, suggesting that migration of $Mn^{2+}$ ions to the graphite anode is significantly suppressed. Further full-cell data including voltage profiles and coulombic efficiency are provided in FIG. 6.

Figure 7A:
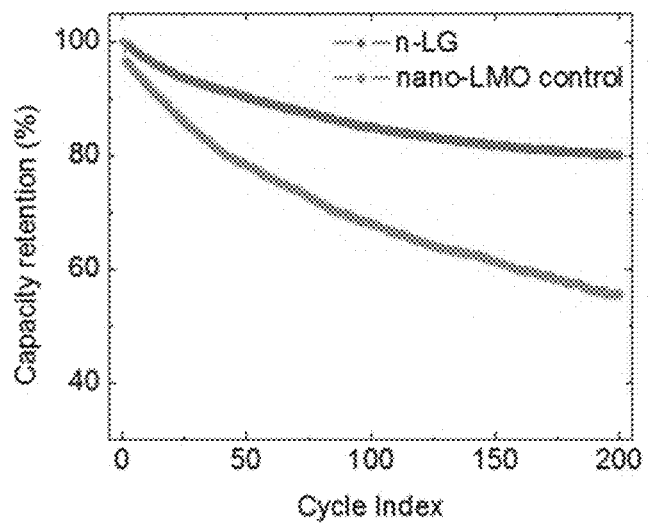
FIGS. 7A-E. Stability comparison of n-LG and nano-LMO control at 55° C. (A) Capacity retention of n-LG and nano-LMO control. (B,C) Voltage profile evolution of n-LG (B) and nano-LMO control (C). (D) dQ/dV curves corresponding to the voltage profiles of n-LG (top) and nano-LMO control (bottom). (E) Electrochemical impedance spectra of n-LG and nano-LMO control before cycling (top) and after 20 cycles at 55° C. (bottom).
Figure 7B:
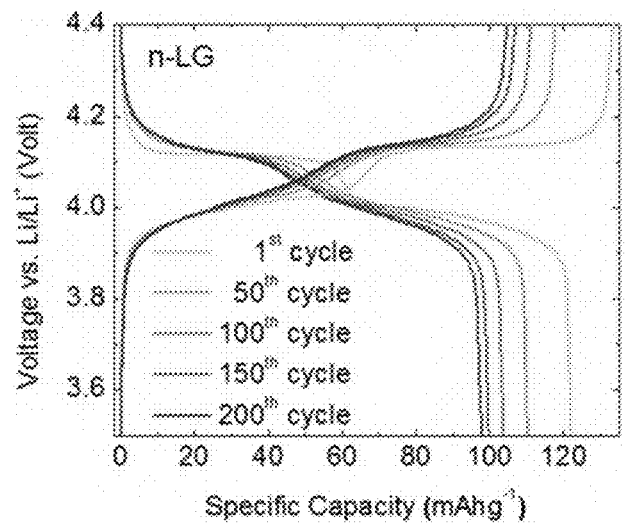
Figure 7C:
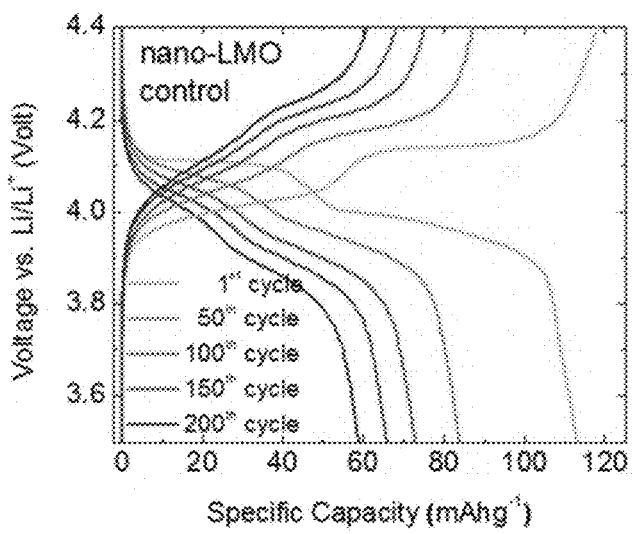
Figure 7D:
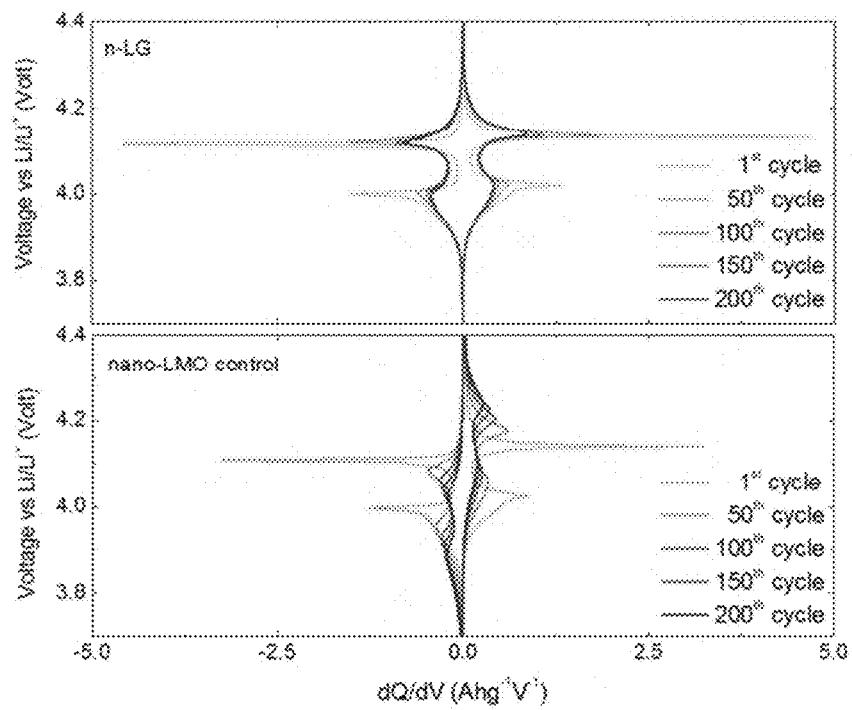

Because elevated temperatures are known to accelerate the degradation mechanisms of LMO, cells are commonly cycled at 55° C. as an additional test of stability. Under these conditions, as depicted in FIG. 7A, n-LG exhibits superior cycling stability relative to the control. While n-LG retains 80% of its first cycle capacity at the $200^{th}$ cycle, the control retains only 55%. To provide further characterization of the electrodes during cycling, voltage profile curves are shown in FIG. 7B and FIG. 7C for the n-LG and control, respectively, which clearly illustrate the disparity in cathode evolution. For n-LG, the voltage plateaus for charge/discharge cycles stay at constant positions despite a slight increase in their slopes, whereas for the control, the plateaus shift up and down, respectively, with more pronounced increase in slopes. The dQ/dV curves (FIG. 7D) further confirm that the positions of the charge/discharge peaks remain constant for n-LG, while showing an increased splitting for the control. These results indicate a significant increase of polarization in the control cathode due to increased LMO resistance. In contrast, as a result of the high electrical conductivity and enhanced electrochemical stability afforded by the GNF network, the electrode polarization for n-LG is small and relatively invariant during high temperature cycling, giving rise to improved capacity retention and energy efficiency (see, below).

Figure 7E:
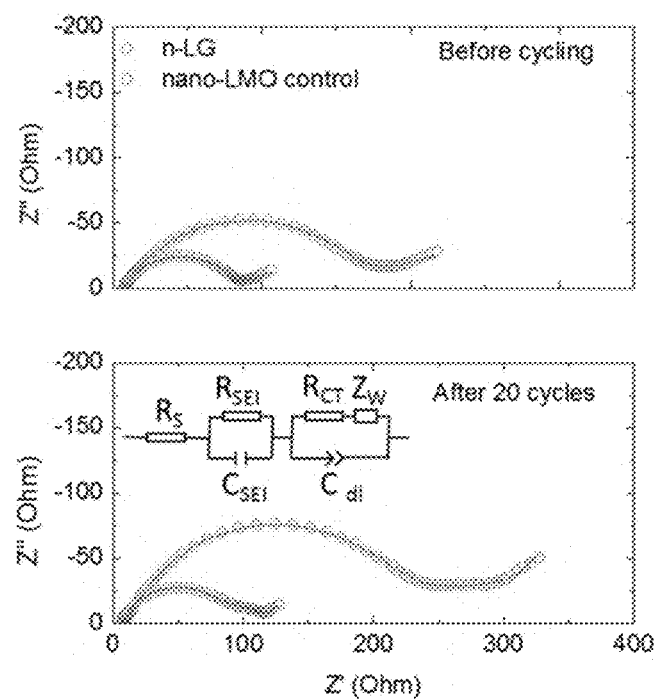
Figure 8:
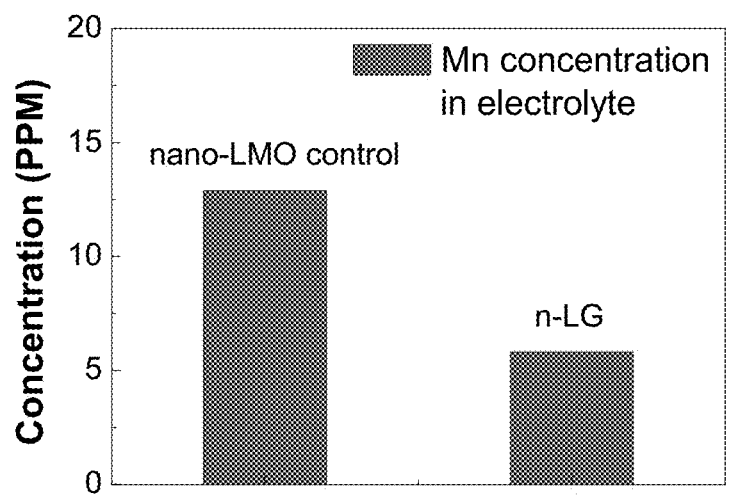
FIG. 8. ICP-MS measurements of Mn concentration in the electrolyte.

Electrochemical impedance spectroscopy (EIS) taken at 50% depth of discharge before and after battery cycling at 55° C. corroborates this conclusion. The equivalent circuit shown in the inset of FIG. 7E is used to fit the impedance spectra, where $R_s$ is the electrolyte resistance, and $R_{SEI}$ and $C_{SEI}$ reflect the resistance and geometric capacitance, respectively, of the anode/cathode solid-electrolyte interphase (SEI). $R_{CT}$ is assigned to the charge-transfer resistance of the cathode, $C_{dl}$ represents the double-layer capacitance that relates to the roughness of the cathode particle surface. $W_S$ is the Warburg diffusional impedance corresponding to the slope of the low-frequency region, which relates to the Warburg diffusion of Li ions in the solid phase of the cathode particles. As shown in FIG. 7E and Table 1, $R_{SEI}$ (solid-electrolyte interface resistance) of the nano-LMO electrode is decreased and stabilized by substituting carbon black in the cathode with graphene since the electrode/electrolyte interfacial layer forming on graphene is thinner and more well-defined. After 20 cycles, $R_{SEI}$ of the nano-LMO control increases 30%, from 148.3Ω to 191.5Ω, caused by the change of the interfacial layer at the cathode. In contrast, $R_{SEI}$ of n-LG only increased from 73.4Ω to 84.9Ω, as graphene nanoflakes in the cathode hinder Mn dissolution, thus alleviating surface degradation of the interfacial layer. Moreover, graphene in the n-LG cathode also significantly mitigates $R_{CT}$ (charge transfer resistance) increases during cycling. Although the initial $R_{CT}$ of the two cells were very similar, a substantial divergence in impedance changes after 20 cycles is observed between the cells. In particular, the $R_{CT}$ of the nano-LMO control increases from 1.0Ω to 212.2Ω, while that of the n-LG cell only changes from 1.1Ω to 27.0Ω. The significant increase in $R_{CT}$ of the nano-LMO control is believed to account for the cell polarization illustrated in the voltage profiles (FIG. 7C) and is likely caused by a structural change of the cathode surface and cathode/electrolyte interface due to Mn dissolution. On the other hand, comparatively stable $R_{CT}$ in the n-LG cell is due to the high electrical conductivity and conformal coating of graphene, which promotes efficient charge transfer, in addition to its mitigating effect on Mn dissolution. A direct measurement using inductively coupled plasma mass spectrometry (ICP-MS) of dissolved Mn for the n-LG and control at 55° C. reveals an average of two times lower Mn concentration in the electrolyte for n-LG (FIG. 8), further confirming the impedance spectroscopy analysis and capacity retention studies.

TABLE 1

Fitted equivalent circuit parameters for the impedance spectra in FIG. 7E.

| | Gr (coin cell) | control (coin cell) |
|---|---|---|
| $R_{SEI}$ ($1^{st}$ cycle) | 73.4 | 148.3 |
| $R_{SEI}$ ($20^{th}$ cycle) | 84.9 | 191.5 |
| $R_{CT}$ ($1^{st}$ cycle) | 1.1 | 1.0 |
| $R_{CT}$ ($20^{th}$ cycle) | 27.0 | 212.2 |

Figure 9A:
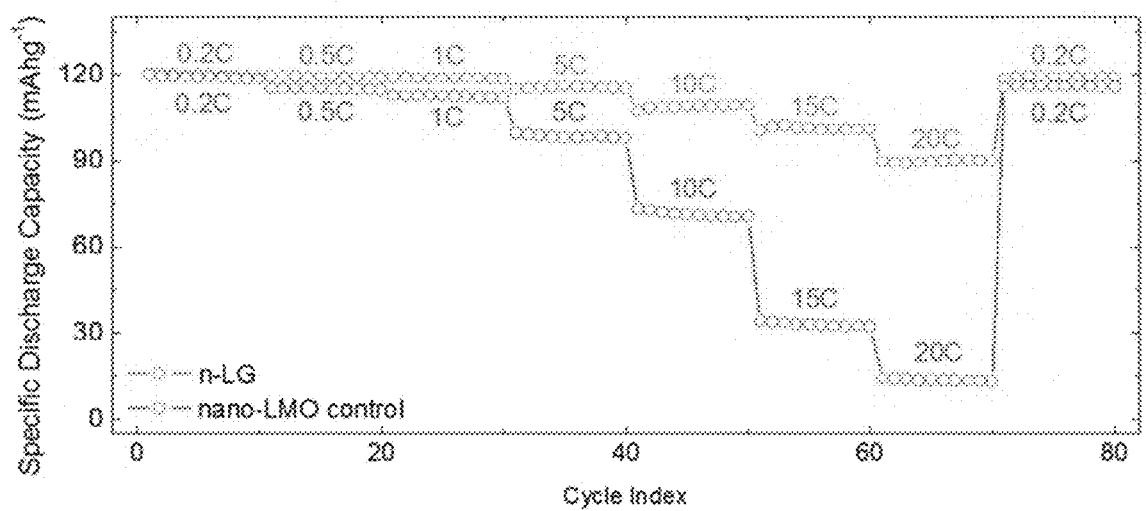
FIGS. 9A-C. Rate capability comparison. (A) Rate capability measurements of n-LG and nano-LMO control with various current rates from 0.2C to 20C. (B,C) Voltage profiles at different discharge current rates for n-LG (B) and nano-LMO control (C).
Figure 9B:
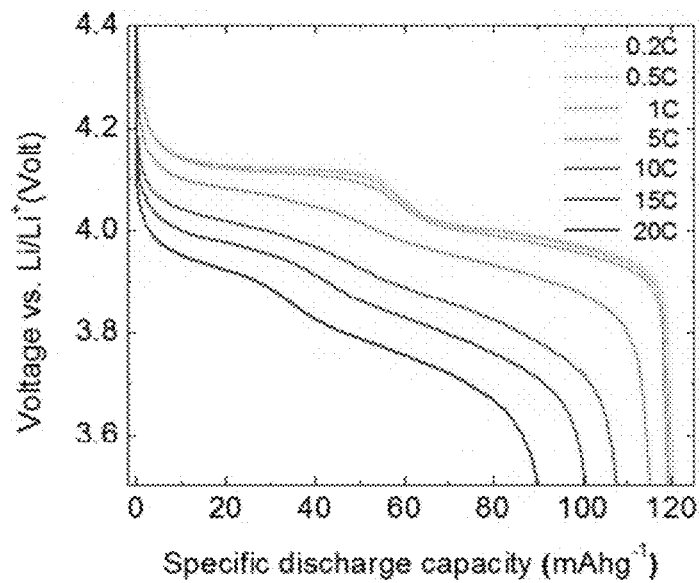
Figure 9C:
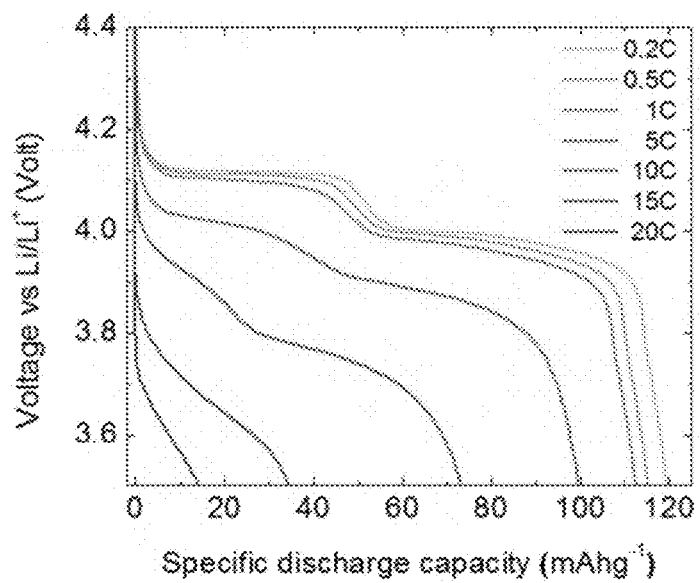
Figure 10:
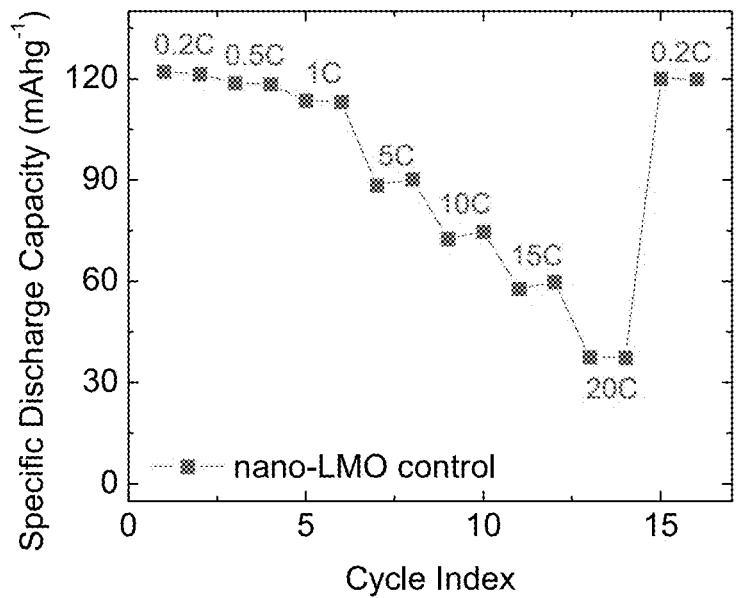
FIG. 10. Rate capability measurement of the nano-LMO control with 3 times lower active materials mass loading relative to that of n-LG. This condition matches the thickness between the nano-LMO control and n-LG.

The rate capability of n-LG and nano-LMO control are presented in FIG. 9A, for which specific discharge capacities are measured at current rates ranging from 0.2C to 20C. During the tests, charge and discharge currents are increased concurrently. As shown by the discharge voltage profiles in FIG. 9B and FIG. 9C, n-LG exhibits excellent power performance. In particular, with respect to that obtained at 0.2 C, n-LG retains 100%, 95%, 90%, 85%, and 75% capacity at 1C, 5C, 10C, 15C, and 20C, respectively. To rule out a possible electrode-thickness effect in the rate performance comparison, a rate capability test was also performed for the nano-LMO control (FIG. 10) with ⅓ mass loading to match the thickness of the n-LG electrode. The controls in either case (same nano-LMO mass loading or electrode thickness), however, show significantly inferior power performance, likely due to the much lower electrical conductivity of the electrode. Because reduced LMO particle size induces large interparticle resistance due to low packing density, more conductive carbon additive is required to form a sufficient percolating network to achieve equally high electrical conductivity and comparable power performance to n-LG. Indeed, most reported high-power nanostructured cathodes contain only 75% wt. or less of active material, which compromises volumetric and gravimetric energy density when considering a full cell. The achievement of superlative power performance with 90% active material loading, enabled by the high electrical conductivity and favorable morphology (i.e., high aspect ratio) of pristine GNFs in binder-free n-LG, offers a considerable advantage for wide-ranging applications.

Despite their widespread use across many industries, LIBs also suffer a significant drawback of poor low-temperature performance. For many applications, such as personal mobile electronics, electric vehicles, and high altitude aircraft, the additional weight and energy consumption of onboard heating elements for temperature regulation are prohibitive. Given the excellent power performance of the n-LG cathode, rate performance tests were performed at low temperature to assess whether this advance will translate to improved performance at 0° C. and −20° C. Here, the same electrolyte was used without adding any specialized solvents or additives.

Figure 11A:
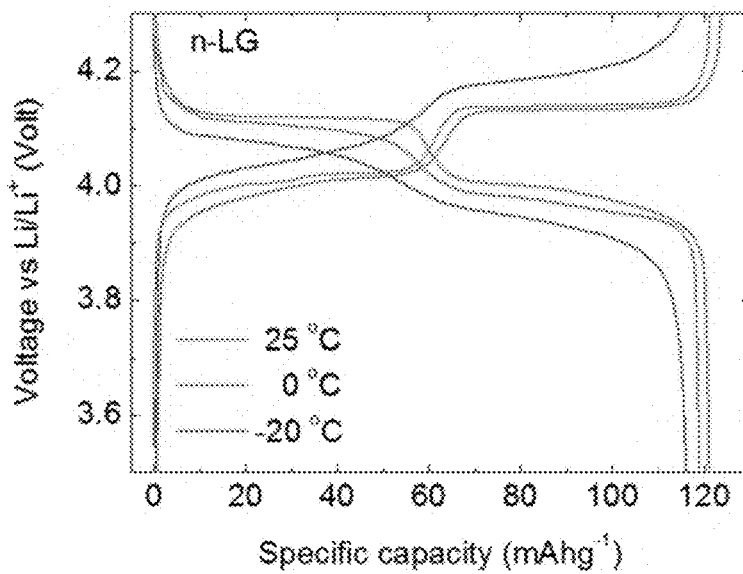
FIGS. 11A-F. Low temperature performance of n-LG cathode. (A,B) Voltage profiles of n-LG and nano-LMO control, respectively, with current rate of 0.2C at 25° C., 0° C., and −20° C. (C,D) Rate capability measurements of n-LG and nano-LMO control, respectively, carried out at 25° C. and 0° C. (E) Direct rate capability comparison between n-LG and nano-LMO at −20° C. (F) Electrochemical impedance spectra of n-LG and nano-LMO control at 25° C. (top), 0° C. (middle), and −20° C. (bottom).
Figure 11B:
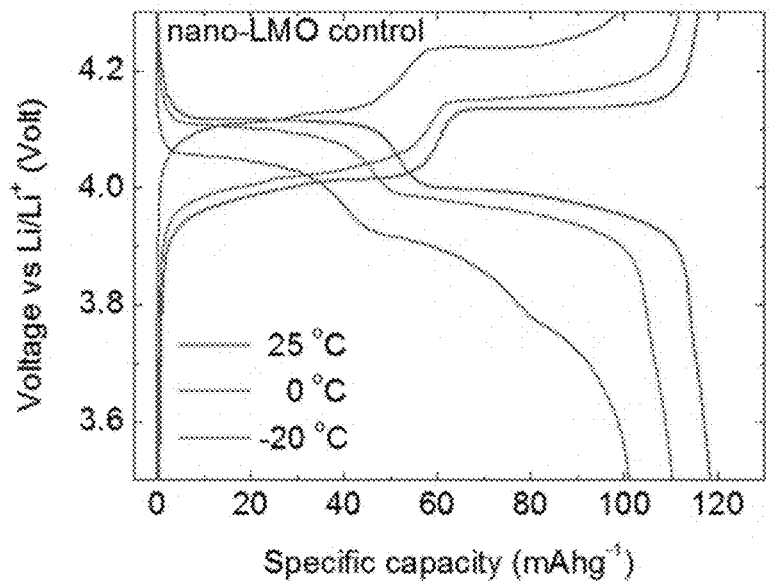
Figure 11C:
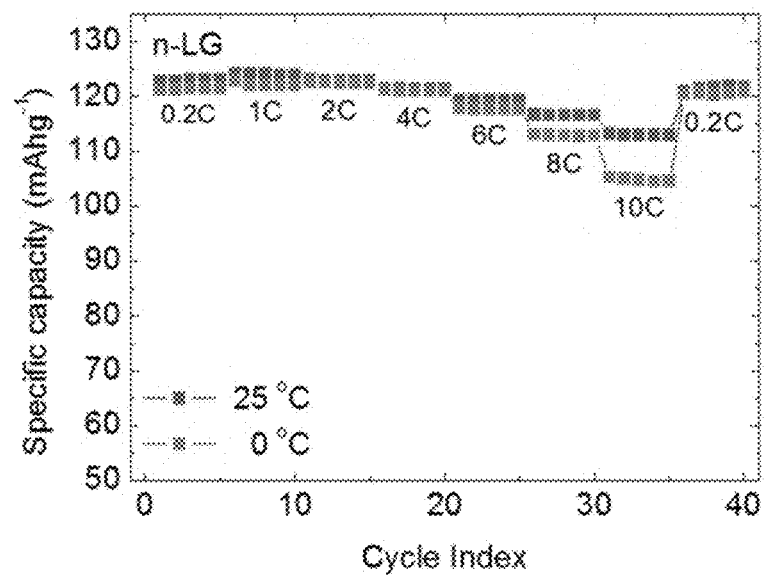
Figure 11D:
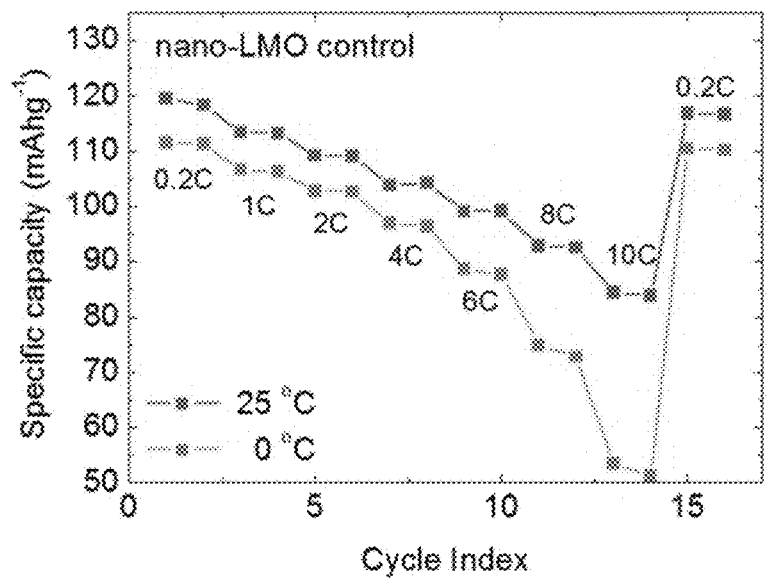
Figure 11E:
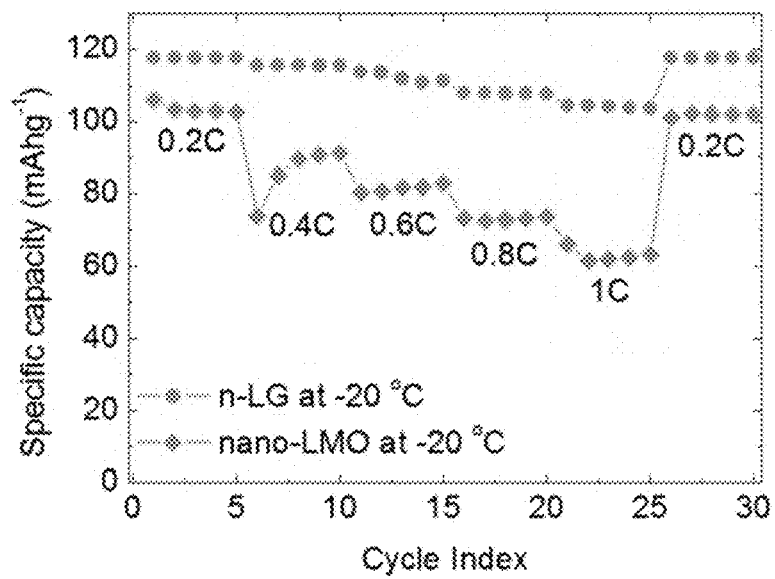

FIG. 11A and FIG. 11B show the voltage profiles of n-LG and nano-LMO control, respectively, taken at a current rate of 0.2C at 25° C., 0° C., and −20° C. In the case of n-LG, only minor changes in the shape and plateau position are observed for the voltage curves at 25° C., 0° C., and −20° C., indicating that the n-LG maintains appreciably fast kinetics at low temperature. On the other hand, the voltage profiles of the nano-LMO control at low temperatures (FIG. 11B) show much more pronounced polarization in the cathode electrode. In FIG. 11C, it is evident that n-LG has equivalent rate capabilities at 25° C. and 0° C. up to 6C, with only slight differences at 8C and 10C. Under the same measurement conditions, the nano-LMO control shows clearly inferior rate performance at 0° C. (FIG. 11D). Furthermore, at −20° C. (FIG. 11E), n-LG retains a remarkable 96% of its room-temperature capacity at 0.2C, and even exhibits excellent capacity/retention (105mAhg$^{-1}$/88%) at 1C, while the nano-LMO control retains only 85% at 0.2C and 51% at 1C, respectively.

Figure 11F:
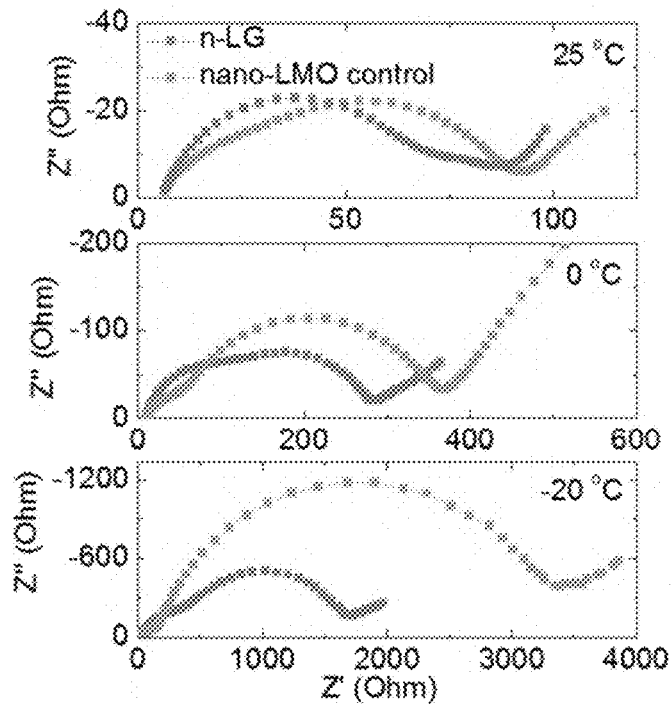
Figure 12A:
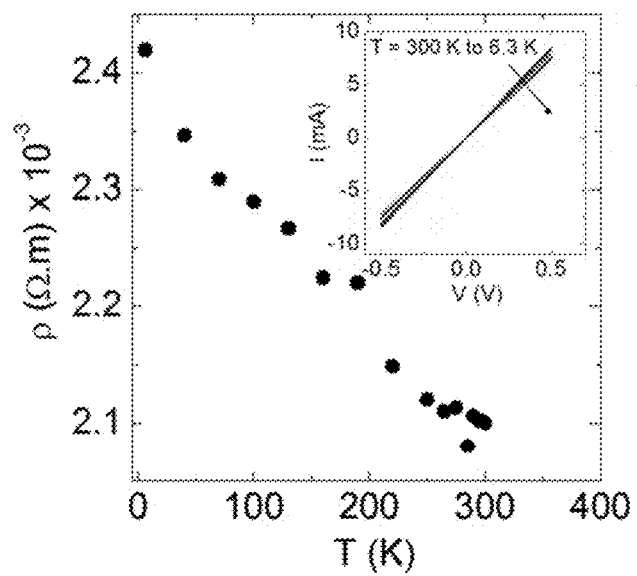
FIGS. 12A-B. Temperature-dependent electrical resistivity measurements. Electrical conductivity of n-LG (A) and nano-LMO control (B) electrodes measured at a range of temperatures between 6.3 K and 300 K.
Figure 12B:
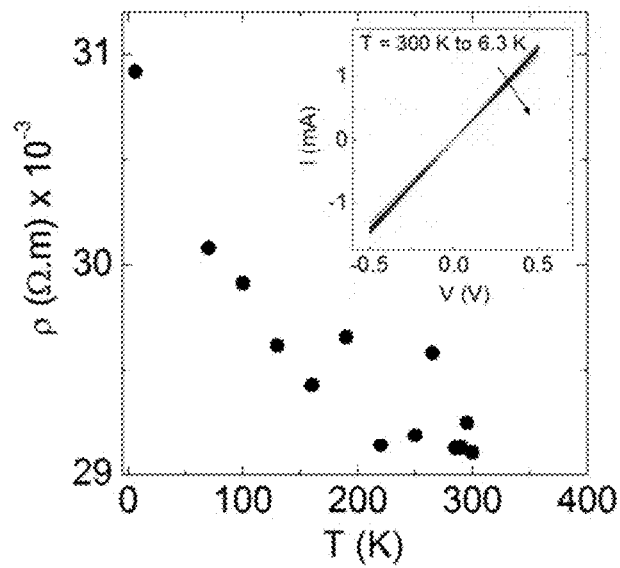

It has previously been suggested that the electrolyte-electrode interface is one of the dominant factors that limits battery kinetics, which would explain why the GNF surface modification in n-LG yields superior low-temperature performance compared to the nano-LMO control. To further elucidate the underlying role of GNF in n-LG cathodes, temperature-dependent electrical conductivity measurements of both n-LG and nano-LMO control were carried out at a temperature range from 6 K to 300 K (FIG. 12). It is evident that both cathodes have nearly constant electrical conductivity in the entire temperature range, whereas the value for the nano-LMO control is one order of magnitude lower than that for n-LG. Since the electrical conductivity of LMO decreases by three orders of magnitude from 25° C. to −20° C., it is plausible that the local charge transfer efficiency from the conducting agents (i.e., graphene or carbon black) to the nearly insulating LMO surfaces is the limiting factor for cathode performance at low temperatures. Therefore, as suggested by FIGS. 1H-I, the large and intimate contact between nano-LMO and GNFs in n-LG offers a more desirable morphology to promote efficient charge transfer, thereby giving rise to the observed superior low-temperature performance. This conclusion is further supported by the temperature-dependent EIS measurements shown in FIG. 11F, where the impedance difference (diameter of the semicircle) between the n-LG and nano-LMO control becomes larger as the temperature decreases.

EXAMPLES OF THE INVENTION

The following non-limiting examples and data illustrate various aspects and features relating to the composites, lithium-ion battery anodes and cathodes and related methods of use and preparation, as are available through the methodologies described herein. In comparison with the prior art, the present composites, anodes, cathodes, batteries and related methods provide results and data which are surprising, unexpected and contrary thereto. While the utility of this invention is illustrated through the use of graphene-ethyl cellulose and LMO compositions and related composites, cathodes and batteries, it will be understood by those skilled in the art that comparable results are obtainable with various other lithium-ion anode and cathode active materials, graphene-cellulosic polymers and related composites, anodes, cathodes and batteries, as are commensurate with the scope of this invention.

Example 1a

LMO active materials were directly purchased from Sigma-Aldrich (>99%). The as-received LMO raw powders were composed of mixtures of microparticles and nanoparticles. After thermal annealing at 700° C. in ambient for 12 hours to improve the particle crystallinity, the LMO powders were dispersed in NMP. The LMO/NMP dispersion was agitated in an ultrasonication bath for three hours and subsequently centrifuged at 2,000 rpm for 5 minutes. The supernatant was collected and used as nano-structured LMO for both n-LG and nano-LMO control samples.

Example 1b

Graphene/ethyl cellulose was prepared following previously established methods. (See, U.S. Pat. Nos. 9,834,693 and 9,902,866—each of which is incorporated herein by reference in its entirety.) Briefly, ethyl cellulose (Sigma Aldrich, 4 cP grade) was dissolved in ethanol (Koptec, 200 proof) at a concentration of 10 mg/mL. Graphite (Asbury Graphite Mills, grade 3061) was added to this solution (180 g graphite:900 mL solution) and shear mixed at 10,230 rpm for 2 hours using a Silverson L5M-A high shear mixer. The resulting dispersion was centrifuged at 7,500 rpm (~10,000 g) for 2 hours using a Beckman Coulter J26 XPI centrifuge to remove large graphite flakes. The supernatant containing graphene, ethyl cellulose, and ethanol was collected and flocculated by adding a solution of sodium chloride (0.04 g/mL) in a 9:16 wt. ratio (NaCl(aq):dispersion), and then centrifuged at 7,500 rpm for 6 minutes to collect the graphene/ethyl cellulose solid. This solid was washed with deionized water, collected by vacuum filtration, and dried to yield a graphene/ethyl cellulose composite powder with 27% wt. graphene.

Example 1c

Finally, nano-LMO and graphene/ethyl cellulose powder were both dispersed in NMP in a 9:3.7 wt. ratio and the resulting dispersion was further sonicated for 3 hours before it was used for electrode fabrication.

Example 1d

Various other organic solvents for graphene exfoliation and hydrophobic fluids for anode and cathode (e.g., LMO) active material dispersion, together with media for anode and cathode fabrication, will be well-known to those skilled in the art made aware of this invention, such solvents, fluids and media including but not limited to those described in the aforementioned, incorporated '693 and '866 patents.

Example 2

To estimate the packing density of the electrodes, both n-LG dispersion and nano-LMO control slurries were uniformly coated on Si wafers with a layer of 300 nm thermal oxide. Subsequently, the control electrodes were completely dried at 90° C. in a vacuum oven for 12 hours, and the n-LG was annealed at 285° C. in ambient for 3 hours. The Si wafers were then cut into 1 cm$^2$ square pieces and weighed to obtain the total mass of the Si substrates with the battery electrodes. The Si substrates were cleaved to form a sharp cross-section view of the battery electrodes. The thickness of the battery electrodes was subsequently investigated by SEM. After confirming the uniformity and value of the thickness, volumes of the battery electrodes were obtained. Finally, the battery electrodes were removed from the Si substrates for measuring the weight of the clean Si substrates, such that the weight of the battery electrodes could be calculated by subtracting the weight of the substrates before and after the removal of the battery electrodes. Given the known ratio of nano-LMO to other additives, packing densities based solely on the weight of nano-LMO were obtained. The active material packing density estimated by cross-section SEM observation agrees well with the value of 2.1 g cm$^{-3}$ obtained from FIB-SEM analysis.

Example 3

FIB-SEM tomography was performed according to the following procedure. First, a small portion of the cathode films (purposely made thinner than the sample used for electrochemical measurements) on Al foil was cut out and then vacuum-infiltrated with a low-viscosity epoxy (Buehler Epothin), which gave rise to signal contrast among voids, conducting carbons (i.e., graphene or carbon black), and nano-LMO particles in two-dimensional SEM images. The prepared sample was serial sectioned in a Zeiss NVision 40 FIB-SEM with an image resolution of 6.25 nm and spacing of 6.25 nm between consecutive two-dimensional cross-sectional images.

Example 4

Raman spectroscopy was carried out using a Horiba Scientific XploRA PLUS Raman microscope. Acquisition was performed with an excitation laser line of 532 nm, incident power of ~1 mW, and spot size of ~1 µm$^2$. To collect the signal, a 100× Olympus objective (NA=0.9) was used. The signal was dispersed by a grating with 1800 grooves/mm to a Syncerity CCD detector with a spectral resolution of ~2 cm$^{-1}$.

Example 5

TEM analysis was carried out using a JEOL-2100F transmission electron microscope (TEM) operated at 200 kV. A small portion of n-LG was scrubbed off from the n-LG composite film and collected. The collected powder was then deposited on a TEM grid (lacey carbon purchased from Ted Pella Inc.) and transferred into the TEM column for microstructural study.

Example 6

For half-cell and full-cell studies, 2032 coin-type cells were assembled in an Ar-filled glove box containing Li metal foil and pre-treated graphite anode, respectively, as counter electrodes. The pre-treatment of the graphite anode was achieved by cycling the graphite anode with Li metal foil as a counter electrode for three times and subsequently discharging it completely to form a stabilized SEI on the graphite anodes. The active material mass loading of both the n-LG and nano-LMO control samples are 2 mg cm$^{-2}$, while the graphite anode is 4 mg cm$^{-2}$. The electrolyte used for fabricating all cells was 1 M LiPF$_6$ in ethylene carbonate/dimethyl carbonate (1:1 vol %). All galvanostatic charge/discharge measurements were carried out using Arbin battery test equipment. Voltage windows used for capacity retention evaluation and room temperature rate capability tests were from 3.5 V to 4.4 V in both half-cell and full-cell cases and the current rates used for both studies were 1C (148 mAhg$^{-1}$). For low temperature characterization, the voltage window was between 3.1 V and 4.4 V with the exception that rate capability tests at −20° C. and current rates of 0.5C and 1C used a voltage window between 3.1 V and 4.5 V.

Example 7

The AC impedance spectroscopy of the two-electrode coin cells at 50% depth of discharge were carried out before cycling and after 20 cycles at 55° C. using a Solartron 1470 E cell test system. The frequency range was between 100 kHz and 100 m Hz.

Example 8

Sample preparation for measuring Mn dissolution using ICP-MS. The n-LG composite and nano-LMO control electrodes containing the same amount of nano-LMO (3 mg) were submerged into the same volume of LiPF$_6$ electrolyte (5 mL) at 55° C. for 48 hours. The amount of Mn in the electrolyte was then quantified using ICP-MS. An aliquot of the electrolyte was digested overnight in concentrated nitric acid (70%) at 65° C. and then diluted with deionized water for the measurement on a ThermoFisher X Series II ICP-MS.

Example 9

Figure 13:
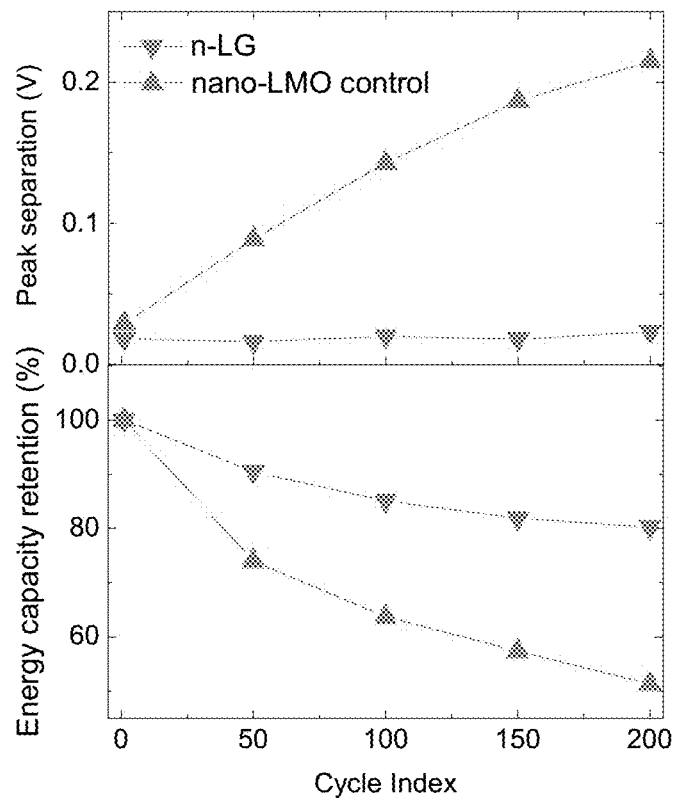
FIG. 13. Correlation of voltage profiles to energy capacity retention. Summary of peak separation of n-LG and nano-LMO control in the dQ/dV plots as shown in FIG. 7D (top). Energy capacity retention of n-LG and nano-LMO control (bottom).

Energy capacity and efficiency are important metrics in evaluating the performance of LIB cells. Energy capacity is determined by integrating the product of the LIB operational voltage and current during charge/discharge cycles. Therefore, it is directly associated with the shape and position of the voltage plateaus and charge capacity. FIG. 13 summarizes the charge/discharge peak separation (top) of the n-LG and control in the V vs. dQ/dV plots in FIG. 7D and shows the corresponding energy capacity retention. It is evident that the energy retention of n-LG is 80% at the $200^{th}$ cycle, which is identical to the charge capacity retention of n-LG, owing to the constant position of the voltage plateaus. On the other hand, the energy retention of nano-LMO control is only 50% at $200^{th}$ cycle, which is 5% lower than the control cell charge capacity retention (55%). The further decrease of energy capacity retention of the control is due to the substantial down-shift of the discharge voltage curve resulting from increased electrode polarization. Therefore, the stable voltage profile of n-LG is highly desirable to ensure optimal energy capacity retention at high operational temperatures.

Figure 14:
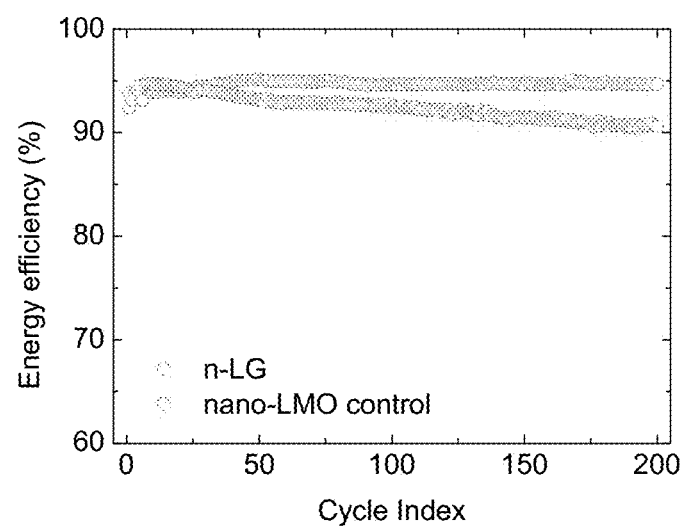
FIG. 14. Energy efficiency of n-LG and nano-LMO control cells cycled at 55° C.

Energy efficiency is the ratio of charge/discharge energy capacities, and indicates how much input energy can be extracted as usable energy during cycling of a LIB cell. FIG. 14 shows the energy efficiency of n-LG and nano-LMO control during charge/discharge cycling at 55° C. For the n-LG cathode, after reaching the $40^{th}$ cycle, the energy efficiency plateaus at 95% throughout the remainder of cycling. In contrast, the energy efficiency of the nano-LMO control monotonically decreases from 95% to 90% at the $200^{th}$ cycle. The stable energy efficiency of the n-LG cell at 55° C. results from the constant position of the voltage plateaus at both charge and discharge curves, while the monotonic decrease of energy efficiency for the nano-LMO control is due to the continuous increase of voltage curve separation as illustrated in FIG. 7C.

As demonstrated, the present invention can be directed to high-performance composite electrodes comprising GNFs and cathode or active material nanoparticles. For instance, with an ethyl cellulose-stabilized slurry, the robust and binder-free composite possesses significantly improved packing density with individually dispersed nano-LMO primary particles and GNFs. The cycling life of the n-LG cathode is superior to that of the nano-LMO control at both 25° C. and 55° C. because the GNFs effectively suppress Mn dissolution and lead to relatively invariant impedance of the electrode. Benefitting from the reduced size of nano-LMO and highly conductive pristine GNFs, the n-LG cathodes exhibit excellent power performance during both charge/discharge cycles up to 20C at room temperature. Moreover, in the extreme condition of −20° C., the n-LG cathode maintains 96% of its room temperature specific capacity in addition to retaining high rate capability at 0° C. Overall, the versatile process proposed here substantially alleviates the disadvantages of many cathode and anode active materials, such as nano-LMO (i.e., low packing density and poor cycling stability) and magnifies its advantages (i.e., fast kinetics) for outstanding power performance and unprecedented low-temperature operation.

We claim:

1. A composite, comprising:
   few-layered graphene, comprising mono-, bi- and n-layered graphene, wherein n is an integer selected from 3 to 6;
   nanoparticles of a material selected from lithium-ion cathode active materials for a lithium-ion battery and lithium-ion anode active materials for a lithium-ion battery; and
   an annealation product of an ethyl cellulose;
   wherein said composite is formed by
   agitating a mixture of said nanoparticles, said few-layered graphene and the ethyl cellulose in a solvent to disperse said nanoparticles and said few-layered graphene with the ethyl cellulose so as to prevent aggregation of said nanoparticles;
   evaporating the solvent from the mixture to form a dispersion of said nanoparticles and said few-layered graphene with the ethyl cellulose; and
   ambient annealing the dispersion at a temperature for a period of time to decompose the ethyl cellulose, thereby resulting in said composite,
   wherein in said composite, said nanoparticles are evenly mixed with said few-layered graphene, and individual said nanoparticles, rather than multi-particle particulates, are conformally coated with a combination of said few-layered graphene and the annealation product of the ethyl cellulose that comprises amorphous carbon with $sp^2$-carbon content, such that Raman spectroscopy of said composite has a peak at 2D-band; and
   wherein said few-layered graphene is not graphene oxide and is not reduced graphene oxide.

2. The composite of claim 1, wherein said cathode active material is selected from lithium cobalt oxide, lithium iron phosphate, lithium manganese oxide (LMO), lithium nickel manganese cobalt oxide and lithium nickel cobalt aluminum oxide.

3. The composite of claim 2, wherein said active material is LMO.

4. The composite of claim 3, wherein said nanoparticles comprise a spinel LMO structure.

5. The composite of claim 1, wherein said anode active material is selected from lithium titanate, natural graphite, artificial graphite, activated carbon, carbon black and silicon.

6. The composite of claim 3, wherein the packing density of said LMO is 2.1 g cm$^{-3}$.

7. The composite of claim 1, wherein a cathode comprising said nanoparticle/graphene composite has a volumetric energy density between 800 and 1200 Wh L$^{-1}$ at 0.2C current rate.

8. The composite of claim 7, wherein said cathode comprising said nanoparticle/graphene composite has a volumetric energy density of 1030 Wh L$^{-1}$ at 0.2C current rate.

9. The composite of claim 1, wherein the temperature is 285° C., and the period of time is 3 hours.

10. The composite of claim 1, wherein the mixture contains 66.7 wt. %, 7.3 wt. %, and 26 wt. % of said nanoparticles, said few-layered graphene, and ethyl cellulose, respectively.

11. The composite of claim 3, wherein said LMO is at least 80 wt. % of said composite.

* * * * *